United States Patent [19]

Brié et al.

[11] 3,964,952

[45] *June 22, 1976

[54] METHOD OF MANUFACTURE OF COMPOSITE MATERIALS CONSISTING OF CARBON FIBERS AND RESIN AND MATERIALS MANUFACTURED IN ACCORDANCE WITH SAID METHOD

[75] Inventors: Michel Brié, Orsay; Gérard Riess, Mulhouse, both of France

[73] Assignee: Commissariat a l'Energie Atomique, Paris, France

[ * ] Notice: The portion of the term of this patent subsequent to Dec. 17, 1991, has been disclaimed.

[22] Filed: Mar. 1, 1974

[21] Appl. No.: 447,289

Related U.S. Application Data

[63] Continuation of Ser. No. 235,303, March 16, 1972, abandoned.

[30] Foreign Application Priority Data

Mar. 19, 1971 France .............................. 71.09820

[52] U.S. Cl. .................................. 156/296; 8/115.6; 156/332; 156/330; 156/315; 156/333; 427/322; 427/412; 427/399; 428/367; 428/420; 423/447

[51] Int. Cl.² .......................................... B32B 5/02
[58] Field of Search ........... 156/309, 330, 332, 333, 156/296, 315; 427/299,322,402,412,399; 428/113, 114, 295, 367, 420, 902; 8/115.6; 423/447

[56] References Cited

UNITED STATES PATENTS

| | | | |
|---|---|---|---|
| 3,754,957 | 8/1973 | Druin et al. | 428/367 X |
| 3,762,941 | 10/1973 | Hou | 427/45 |
| 3,855,174 | 12/1974 | Brié et al. | 260/40 R |

*Primary Examiner*—William A. Powell
*Assistant Examiner*—J. J. Gallagher
*Attorney, Agent, or Firm*—Cameron, Kerkam, Sutton, Stowell & Stowell

[57] ABSTRACT

In a method of manufacture of composite materials consisting of carbon fibers and resin, a polymer is fixed on carbon fibers by means of a chemical bond and the fibers thus coated are then incorporated in a resin which is compatible with the polymer.

21 Claims, No Drawings

METHOD OF MANUFACTURE OF COMPOSITE MATERIALS CONSISTING OF CARBON FIBERS AND RESIN AND MATERIALS MANUFACTURED IN ACCORDANCE WITH SAID METHOD

This is a continuation of application Ser. No. 235,303, filed Mar. 16, 1972, now abandoned.

This invention relates to a method of manufacture of composite materials of resin and carbon fibers and the materials manufactured by means of said method.

A certain number of methods have already been tried for the manufacture of this type of material.

Among others can be mentioned the pre-treatment of carbon fibers by impregnation with a solution containing a resin and immersion of the fibers thus treated in a resin which is identical with that of the pre-treatment.

Another method consists in coating the carbon fibers with a solution of a thermoplastic polymer, in removing the solvent and then in incorporating the coated fibers in a fused polymer.

The composite materials obtained by means of the methods described above are subject to many disadvantages, particularly in regard to their mechanical properties. In fact, when a test-piece consisting of a composite material of resin and carbon fibers, as produced in accordance with conventional methods, is subjected to shearing stresses, delamination is usually observed between the fibers and the matrix. This delamination is liable to result in failure of the test-piece.

The invention provides a method of manufacture of composite materials consisting of carbon fibers and resin which correspond more effectively to practical requirements than those of the prior art, especially insofar as the invention makes it possible to obtain composite materials having higher mechanical strength.

The method in accordance with the invention is primarily characterized in that a polymer is fixed on carbon fibers by means of a chemical bond and that the fibers thus coated are then incorporated in a resin which is compatible with said polymer.

One advantageous feature of the method according to the invention lies in the fact that the polymer is fixed on the carbon fibers by means of a covalent bond. This covalent bond is formed by means of a radical or ionic graft.

Radical grafting consists in initiating polymerization in the presence of the fibers by forming free radicals either by the action of heat in the presence or not of substances such as peroxides, hydroperoxides, azoic derivatives, or by means of Redox systems, or by radiation. The covalent bond is obtained by reaction of transfer or macromolecular radicals onto the sites or the functions of the fiber.

Anionic grafting consists:

either in de-activating an anionic polymer on a surface function of the carbon which constitutes the fibers, or in initiating growth of the polymer chain directly from fiber which has been previously treated with a metal such as lithium, for example.

In accordance with another characteristic feature of the invention, the polymer is fixed on the carbon fibers by means of ionic bonds such as, for example, a hydrogen bond, a dipole-dipole bond, a saline bond. In order to form these ionic bonds, polar functional groups such as carboxyl groups are formed by way of example, both on the fibers and on the polymer. Said carboxyl groups are formed on the fibers by oxidation in a liquid or gaseous medium. These carboxyl functions are introduced on the polymer either by copolymerizing this latter with a monomer such as acrylic acid or methacrylic acid, or by reacting the polymer with a reagent such as thioglycollic acid.

In accordance with a further characteristic feature of the method, the polymer is fixed on the carbon fibers by contacting said fiber with the fused liquid polymer either in solution or in emulsion.

In accordance with the method under consideration, the polymer which is intended to be fixed on the carbon fibers comprises polar groups such as anhydride, ester, carboxyl, hydroxyl, nitrile groups. Moreover, the polymer can comprise functions which are capable of reacting with the resin or alternatively double bonds which can be cross-linked, in the presence of a monomer, with the resin when this latter contains unsaturations. By way of non-limitative examples of these polymers, mention can be made of the following : the vinyl acetate-vinyl chloride copolymer, the alternate maleic anhydride-styrene copolymer, the methyl methacrylate-maleic anhydride copolymer, the polyethylenemaleic anhydride copolymer, the polyvinylpyridine copolymer.

The resin which is intended to constitute the matrix of the composite material in accordance with the method of the invention must be compatible with the polymer. This resin can be chosen, for example, from the group constituted by the polyesters, the epoxy resins, the polyimides.

Examples of application of the method according to the invention are given hereinafter. As will be readily understood, the description of these examples does not imply any limitation of the invention.

In the following examples 1 and 2, the polymer is fixed on the carbon fiber by means of a covalent bond.

EXAMPLE 1

Radical grafting of an alternate copolymer consisting of maleic anhydride-styrene (MAS) is carried out on carbon fibers obtained from petroleum tar pitch by initiating the polymerization by thermal process. The fibers are placed in a pyrex tube in the presence of maleic anhydride which has been purified beforehand by re-crystallization in chloroform. Styrene, then toluene are then added by cryopumping under vacuum (temperature of liquid $N_2$). The tube is then sealed under vacuum, then heated in a thermostaticallycontrolled bath for a period of 6 hours at 90°C.

| Operating conditions | |
|---|---|
| Pitch fibers | 0.500 g |
| Toluene | 50 cm$^3$ |
| Styrene | 7.5 cm$^3$ |
| Maleic anhydride | 12.8 g. |

The fibers of the reaction mixture are separated and subjected to extraction by acetone in the hot state for a period of 17 hours in order to eliminate the excess of MAS copolymer. The fibers are then dried under vacuum for 5 hours at 50°C.

After this treatment, the degree of grafting (weight of polymer grafted in respect of 100 g of fibers) can then be determined by quantitative elementary analysis.

The fibers are then dipped for a period of 10 minutes in a polyester resin of the type known as "Polylite BH 719" (Reichold Bekacite) in solution in toluene (5 g of resin for 1 g of toluene). The fibers are dried-out and incorporated in the polyester resin containing 6 % by weight of B1 catalyst (Reichold Bekacite). The aggregate is pressed in the cold state within a metallic mold which has previously been covered with a layer of fluorinated polymer and is allowed to harden for a period of 2 hours. The testpiece obtained (having dimensions of 1 × 2 × 70 mm) and containing 75 % by weight of fibers is subjected to shearing tests. The measurements are carried out with an aspect ratio $1/h = 2.5$ (1 = length or distance between knife edge and recess and h = thickness of the test-piece.

Results:
| | |
|---|---|
| Percentage of fibers by weight | 75 % |
| Degree of grafting | 1.1 % |
| Shear strength (mean value out of 5 measurements) | 5.5 kg/mm$^2$ |
| Shear strength of a composite (untreated polyester fibers) | 3.1 kg/mm$^2$ |

EXAMPLE 2

It is possible to increase the degree of grafting of the copolymer by increasing the concentrations of monomers.

| Operating Conditions: | |
|---|---|
| Fibers of pitch | 0.5 g |
| Toluene | 10 cm$^3$ |
| Styrene | 7.5 cm$^3$ |
| Maleic anhydride | 12.8 g |
| Temperature | 90°C |
| Duration of polymerization | 6 hours |
| Results: | |
| Degree of grafting | 17 % |

In example 3 above, the polymer is fixed on the fiber by means of an ionic bond of the hydrogen bond type. Previously oxidized fibers are employed and put in the presence of a partially hydrolyzed copolymer so as to open the anhydride bridges and to form carboxylic functions.

EXAMPLE 3

Carbon fibers known commercially by the name "Rigilor" type A.C. (Le Carbone Lorraine) are oxidized by air at 450°C to a degree of wear of 4.18 % and are then dipped for a period of 10 minutes in a solution of MAS in acetone containing 5 % distilled water (1 g of copolymer per liter of solvent). The fibers are then washed in acetone for a period of 20 minutes and dried in air. They are then incorporated in an epoxy resin (CIBA LY 556/HT 973).

| The fabrication characteristics are as follows: | |
|---|---|
| Epoxy resin LY556 | 10 g |
| Hardener | 0.25 g |
| Molding pressure | 2 kg/cm$^2$ |
| Temperature | 160°C |
| Duration | 2 hours. |

Prior to molding in a metallic mold previously covered with a layer of fluorinated polymer, the fibers are pre-impregnated for a period of 30 minutes at 80°C with a solution of resin (8 g of resin in 2 g acetone). After drying-out, the aligned fibers are subjected to a second impregnation in resin under the same conditions of duration and temperature with the resin and the hardener.

The composite obtained (1 × 2 × 70 mm) containing 75 % by weight of fibers is subjected to ultimate shear stress testing under the same conditions of measurement as those described in Example 1.

| Results: | |
|---|---|
| Shearing load at fracture (mean value for 20 measurements) | 6.2 kg/mm$^2$. |

The ultimate shear strength obtained over 120 measurements of a composite consisting of epoxy resin plus untreated fibers is 5.6 kg/mm$^2$ ± 0.3.

In examples 4 to 8 given below, the polymer is fixed on the fiber by means of an ionic bond of the dipoledipole type. The superficial carboxylic functions created as a result of controlled oxidation of the fibers are salified and said fibers are then contacted with a copolymer comprising carboxylic functions which are also salified either completely or partially.

EXAMPLE 4

Fibers known as Rigilor type AC oxidized by air at 450°C to a degree of wear of 4.8 % are salified by 0.1 N NaOH at boiling point over a period of 8 hours; after rinsing with acetone and drying under vacuum at 50°C, said fibers are immersed for a period of 24 hours in a solution of MAS in acetone (1 g of copolymer per liter of acetone) which has previously been totally salified by 0.1 N NaOH in the presence of phenolphthalein. After rinsing for a period of 20 minutes in two baths of acetone and drying under vacuum at 50°C, the fibers are incorporated in an epoxy matrix of type LY 556/HT 973 in accordance with the same mode of operation as in Example 3.

Over a total of 10 measurements, the mean value of ultimate shear strength (σr) of composites having a base of these treated fibers is 6.3 kg/mm$^2$.

EXAMPLE 5

Instead of totally salifying the anhydride groups, it is possible to salify one anhydride group out of two in the MAS chain.

In this example, different polymers have been employed. Depending on their mode of preparation, these polymers can be characterized by the intrinsic viscosity and the rate of anhydride functions.

a. Intrinsic viscosity
Solvent: methylethylketone
Temperature : 25°C $$\eta = \lim_{c \to 0} \frac{t - t_0}{c \ t_0}$$

with t in seconds c in grams of polymer/100 cm$^3$ of MEK b. the rate of anhydride functions is given by the volume of 0.1 N NaOH which is necessary in order to achieve total salification of 1 g of polymer in solution in acetone.

Rigilor type AC fibers which have been oxidized by ozonized air at 70°C over a period of 5 hours are subjected to a reflux treatment with 0.1 N NaOH for a period of 8 hours. The fibers are then dipped for a period of 10 minutes in a solution of MAS in acetone (5 g of copolymer per liter of acetone) which has been partially salified (one anhydride group out of two) by 0.1 N NaOH. After rinsing for twenty minutes in acetone and air-drying at 25°C, these fibers are incorporated in a proportion of 75 % by weight in the epoxy resin and the ultimate shear strength (load at fracture) $\sigma r$ of the composites obtained ($1 \times 2 \times 70$ mm) is then determined.

Results:

| Copolymer | $\eta$ | rate of functions | Number of measurements | $\sigma r$ (kg/mm²) |
|---|---|---|---|---|
| MAS No 1 | 0.712 | 72.5 | 20 | 8.45±0.4 |
| MAS No 2 | 1.16 | 87.2 | 20 | 7.60±0.4 |
| MAS No 3 | 0.600 | 82.4 | 20 | 7.95±0.4 |
| MAS No 4 | 0.465 | 99.2 | 15 | 7.90±0.4 |
| MAS No 5 | $2.95 \times 10^{-2}$ | 80.8 | 20 | 7.15±0.4 |
| MAS No 6 | $6.30 \times 10^{-2}$ | 57.6 | 20 | 7.93±0.4 |
| MAS No 7 | $5.0 \times 10^{-2}$ | 40.0 | 20 | 7.70±0.4 |
| MAS No 8 | $4.0 \times 10^{-2}$ | 48.8 | 20 | 7.50±0.4 |

| | Number of measurements | $\sigma r$ (kg/mm²) |
|---|---|---|
| epoxy + untreated fibers | 120 | 5.60±0.3 |
| epoxy + oxidized fibers (ozonized air - 70°C - 5 hrs | 20 | 6.0±0.4 |

EXAMPLE 6

Use is made of the same AC fibers which have been pre-oxidized by ozonized air and grafting of an MAS No 1 is carried out by the same method as that described in Example 5. After treatment, the fibers are incorporated in a proportion of 75 % by weight in a polyimide resin, type IP 300 (RhonePoulenc) under the following conditions of molding.

The fibers which are pre-impregnated with the polyimide resin are placed within a mold which has previously been covered with a layer of fluorinated polymer and preheated at 150°C. The mold is heated gradually from 80° to 100°C over a period of 3 hours. The composite is then subjected to a pressure of the order of 1 to 2 kg/cm² while being heated to 180°C for a period of 2 hours in an argon atmosphere. An annealing treatment from 150° to 340°C is then carried out for a period of 20 hours.

The shearing stresses at fracture of the composites obtained ($1 \times 2 \times 70$ mm) are as follows:

| | |
|---|---|
| polyimide resin + untreated AC fibers | 3.0 kg/mm² |
| polyimide resin + grafted AC fibers | 6.5 kg/mm² |

EXAMPLE 7

By employing the same mode of operation as in Example 5 in order to graft a No 2 MAS copolymer onto preoxidized AC fibers, the impact strength of epoxy resins reinforced with this type of fiber is increased. Resilience measurements on samples of ($1 \times 12.5 \times 80$ mm) have produced the following results:

(energy of fracture per fractured unit surface in decajoules per square centimeter)

| | |
|---|---|
| epoxy resin + AC fibers | 0.40 daJ/cm² |
| epoxy resin + grafted AC fibers | 0.55 daJ/cm² |

EXAMPLE 8

Instead of MAS, different copolymers consisting of maleic anhydride-polyethylene (MAS) are grafted by means of an ionic bond of the dipole-dipole type. These linear copolymers can be characterized by the rate of anhydride functions defined in Example 5.

The AC fibers, pre-oxidized by ozonized air at 70°C for 5 hours and salified by 0.1 N NaOH in a reflux process for a period of 8 hours, were contacted with the solution of copolymer MAE in acetone (5 g of MAE per liter of acetone) which had been partially salified beforehand by 0.1 N NaOH (one anhydride group out of two).

Results:

| Copolymer | Rate of functions | Number of measurements | $\sigma r$ (kg/mm²) |
|---|---|---|---|
| MAE 11 | 148.5 | 20 | 8.02±0.4 |
| MAE 21 | 144.9 | 20 | 7.85±0.4 |
| MAE 31 | 142 | 20 | 8.20±0.4 |
| Epoxy + untreated fibers | | 120 | 5.6 ±0.3 |
| Epoxy + oxidized fibers (O₃) | | 20 | 6.1 ±0.4 |

Remark:

The MAS and MAE copolymers can be modified, prior to grafting on the fibers, by partial esterification of the anhydride functions by aliphatic alcohols ($C_3$ to $C_{20}$), which thus confer greater flexibility on the grafts.

In the following examples 9 and 10, the polymer is fixed on the fiber by means of an ionic bond of the saline bond type by employing divalent or trivalent cations.

EXAMPLE 9

Carbon fibers obtained from pitch are pre-oxidized by air at 450°C to a degree of wear of 2 %. A quantity of 1.2 g of these pre-oxidized fibers is refluxed by means of an aqueous solution of calcium acetate for a period of 7 hours. The water is then distilled (one half) so as to entrain the formed $CH_3COOH$. The fibers extracted from the reaction mixture are dried in vacuum at 25°C and contacted by dipping with a solution of No 1 MAS (5 g of copolymer per liter of acetone). After washing with acetone (20 minutes), the fibers are incorporated in the epoxy resin in accordance with the mode of operation of Example 3. The ultimate shear strength of the composites is 6.3 kg/mm² ± 0.4 (mean value obtained from 5 measurements).

EXAMPLE 10

Polyvinyl-4-pyridine in solution in an acetonemethanol mixture (0.5 g of copolymer per liter of solvent) is contacted for a period of 8 hours with 0.750 g of fibers of pitch which have been pre-oxidized by air at 450°C (wear = 2 %). After rinsing with an acetonemethanol mixture, the fibers are incorporated in the polyester resin in accordance with the mode of operation of Example 1.

| | |
|---|---|
| Polyester + treated fibers of pitch | $\sigma r = 3.5$ kg/mm²±0.3 |
| Polyester + untreated fibers of pitch | $\sigma r = 3.1$ kg/mm² |

In the examples given above, the carbon fibers subjected to treatment are of the AC type. The modes of operation which are employed can also be applied to graphitized fibers of the AG type.

It is apparent from the examples given in the foregoing that the method according to the invention makes it possible to obtain composite materials of resin and carbon fibers having mechanical properties which are considerably superior to those of materials obtained by means of methods which have been known up to the present time, particularly in regard to resistance to shearing stresses.

This result is due to the chemical bond formed in accordance with the method of the invention between the fiber and the polymer, which provides a stronger fixation than in the composites obtained in accordance with conventional methods, in which only physical bonds were employed.

In addition, the polymer contains polar groups which are capable of attachment both to the fiber and to the matrix.

What we claim is:

1. Process for the manufacture of composite materials of carbon fibers and resin comprising the steps of radical grafting a polymer on carbon fibers by covalent bond, obtaining the bond by creation of free radicals on the polymer by heat and transfer reaction of the radicals on the sites of the carbon fibers and then incorporating the grafted fibers in a resin compatible with the polymer.

2. Process for the manufacture of composite materials of carbon fibers and resin comprising the steps of radical grafting a polymer on carbon fibers by covalent bond, obtaining the bond by creation of free radicals on the polymer by an oxydo-reducing system and transfer reaction of the radicals on the sites of the carbon fibers and then incorporating the grafted fibers in a resin compatible with the polymer.

3. Process for the manufacture of composite materials of carbon fibers and resins comprising the steps of radical grafting a polymer on carbon fibers by covalent bond, obtaining the bond by creation of free radicals on the polymer by radiation and transfer reaction of the radicals on the sites of the carbon fibers and then incorporating the grafted fibers in a resin compatible with the polymer.

4. A process for the manufacture of a composite material of carbon fibers and resins comprising the steps of grafting a polymer on carbon fibers by an ionic bond selected from the group consisting of hydrogen bond, dipoledipole bond and saline bonds, obtaining the bond by first oxidizing the carbon fibers, placing the thus treated fibers in contact with the polymer and then incorporating the grafted fibers in a resin compatible with the polymer.

5. Process for the manufacture of a composite material of carbon fibers and resins comprising the steps of grafting a polymer on the carbon fibers by an ionic bond of the hydrogen bond type, obtaining the bond by first oxidizing the carbon fibers and then placing the thus treated fibers in contact with the polymer and then incorporating the grafted fibers in a resin compatible with the polymer.

6. Process for the manufacture of composite materials of carbon fibers and resin comprising the steps of grafting a polymer on the carbon fibers by an ionic bond of the dipoledipole type, obtaining the bond by first oxidizing the carbon fibers, then salifying the superficial carboxylic functions thus obtained on the fibers, placing the fibers in contact with a polymer having partially salified carboxylic functions and then incorporating the grafted fibers in a resin compatible with the polymer.

7. Process for the manufacture of composite materials of carbon fibers and resins comprising the steps of ionic grafting a polymer on the carbon fibers by a saline type bond, obtaining the bond by first oxidizing the carbon fibers, then salifying the thus treated fibers and the salifiable function of the polymer in the presence of a divalent or trivalent cation, and then incorporating the grafted fibers in a resin compatible with the polymer.

8. Process for the manufacture of composite materials of carbon fibers and resins comprising the steps of ionic grafting a polymer on the carbon fibers by a bond of the saline type, obtaining the bond by first oxidizing the carbon fibers, then salifying the superficial carboxylic functions thus created on the carbon fibers in the presence of a divalent or trivalent cation, and contacting the thus treated fibers with the polymer having salifiable functions and then incorporating the grafted fibers in a resin compatible with the polymer.

9. Process as described in claim 1, the polymer having polar groups selected from the groups consisting of anhydride, ester, hydroxyl, carboxylic, and nitrile groups.

10. Process as described in claim 1, the polymer being selected from the group consisting of the vinyl acetatevinyl chloride copolymer, the alternate maleic anhydridestyrene copolymer, the methyl methacrylatemaleic anhydride copolymer, the polyethylene-maleic anhydride copolymer and the polyvinyl-pyridine copolymer.

11. Process as described in claim 1, the resin being selected from the group consisting of the polyester, epoxy and polyimide resins.

12. Process as described in claim 4, the polymer having polar groups selected from the groups consisting of anhydride, ester, hydroxyl, carboxylic and nitrile groups.

13. Process as described in claim 4, the polymer being selected from the group consisting of the vinyl acetatevinyl chloride copolymer, the alternate maleic anhydridestyrene copolymer, the methyl methacrylate anhydride copolymer, the polyethylene-maleic anhydride copolymer and the polyvinylpyridine copolymer.

14. Process as described in claim 4, the resin being selected from the group consisting of the polyester, epoxy and polyimide resins.

15. A process for the manufacture of a composite material of carbon fibers and resins comprising the steps of grafting a polymer on the carbon fibers by an ionic bond of the hydrogen bond type, obtaining the bond by first oxidizing the carbon fibers and then placing the thus treated fibers in contact with the partially hydrolyzed polymer and then incorporating the grafted fibers in a resin compatible with the polymer.

16. Process as described in claim 2, the polymer having polar groups selected from the groups consisting of anhydride, ester, hydroxyl, carboxylic and nitrile groups.

17. Process as described in claim 2, the polymer being selected from the group consisting of the vinyl acetate-vinyl chloride copolymer, the alternate maleic anhydride-styrene copolymer, the methyl methacrylate anhydride copolymer, the polyethylene-maleic anhydride copolymer and the polyvinyl-pyridine copolymer.

18. Process as described in claim 2, the resin being selected from the group consisting of the polyester, epoxy, and polyimide resins.

19. Process as described in claim 3, the polymer having polar groups selected from the groups consisting of anhydride, ester, hydroxyl, carboxylic and nitrile groups.

20. Process as described in claim 3, the polymer being selected from the group consisting of the vinyl acetate-vinyl chloride copolymer, the alternate maleic anhydride-styrene copolymer, the methyl methacrylate anhydride copolymer, the polyethylene-maleic anhydride copolymer and the polyvinyl-pyridine copolymer.

21. Process as described in claim 3, the resin being selected from the group consisting of the polyester, epoxy and polyimide resins.

* * * * *